United States Patent [19]
Richter

[11] Patent Number: 5,346,295
[45] Date of Patent: Sep. 13, 1994

[54] COMPACT DISC STORAGE BOX AND RACK

[75] Inventor: Herbert Richter, Englesbrand, Fed. Rep. of Germany

[73] Assignee: Herbert Richter, Metallwaren-Apparatebau GmbH & Co., Pforzheim, Fed. Rep. of Germany

[21] Appl. No.: 7,721

[22] Filed: Jan. 22, 1993

[30] Foreign Application Priority Data

May 4, 1992 [DE] Fed. Rep. of Germany ....... 9205830

[51] Int. Cl.$^5$ .............................................. A47B 81/06
[52] U.S. Cl. .................................. 312/9.12; 312/9.19; 312/9.17
[58] Field of Search .................... 312/9.9–9.12, 312/9.16–9.17, 9.19, 9.23–9.26; 206/15, 307–309, 387; 211/40; 360/133

[56] References Cited

U.S. PATENT DOCUMENTS

| | | | |
|---|---|---|---|
| 4,054,344 | 10/1977 | Fujimoto et al. | 312/319 |
| 4,055,372 | 10/1977 | Tozawa et al. | 312/15 |
| 4,330,161 | 5/1982 | Khawand | 312/9 |
| 4,664,454 | 5/1987 | Schatteman et al. | 312/13 |
| 4,738,361 | 4/1988 | Ackeret | 206/307 |
| 4,913,296 | 4/1990 | Cournoyer et al. | 211/41 |

*Primary Examiner*—Peter R. Brown
*Assistant Examiner*—Nancy Mulcare
*Attorney, Agent, or Firm*—Klaus J. Bach

[57] ABSTRACT

A compact disc storage box for receiving a compact disc consisting of a flat housing having bottom and cover plates, wherein a disc carrier is drawer-like supported so as to be slidable between inserted and outer end positions, has means for urging the disc carrier toward either of its end positions including a spring clip mounted pivotally on the bottom plate and engaging the disc carrier for urging it toward and retaining it in its end positions.

14 Claims, 1 Drawing Sheet

COMPACT DISC STORAGE BOX AND RACK

BACKGROUND OF THE INVENTION

The invention relates to a compact disc storage box for the reception of compact discs (CDs). More specifically, the invention relates to a CO storage box in which a disc carrier is supported drawer-like so as to be slidable against the force of a spring and retainable in its inserted end position by releasable retaining means.

Compact discs are usually supplied in a plastic box provided with a pivot cover. For storing, that is, stacking, or these boxes shelves or particular length and particular height and with dividers providing for shelf spaces for inserting the boxes are required. The thickness of the boxes and the thickness of the shelf spaces, however, permit the storage of only a relatively small number of such CD boxes.

For the storage of the valuable compact discs in motor vehicles such shelves are particularly unsuitable since the discs are not firmly held in storage shelves. In addition, the grasping and inserting of the compact discs with one hand only is quite difficult. Also, these known storage units require a large amount of storage space.

It is the object of the present invention to provide a compact disc storage box and rack which facilitates the insertion and the grasping of a disc and in which the compact discs are safely and dust-free stored and which further requires a minimum of space. Also such boxes should be simple and inexpensive to manufacture.

SUMMARY OF THE INVENTION

In a compact disc storage box for receiving compact discs, each consisting of a flat housing having cover and bottom plates, a disc carrier is drawer-like supported so as to be slidable between inserted and outer end positions into which the disc carrier is urged and in which it is retained by a spring clip mounted on the bottom plate and engaging the disc carrier so as to cause its movement to one of its end positions. An ejector slide with a button is provided for releasing a compact disc from the box.

The spring clip which is pivotally supported on the bottom plate and engages the disc carrier firmly retains the plate carrier in both end positions, that is, in its extended as well as in its inserted position. By pushing the ejector button or, respectively, the disc carrier, the spring clip only needs to be moved beyond its dead center whereupon it automatically moves the disc carrier to the opposite end position, an arrangement which provide s for a simple structure particularly for the ejector means. Besides the arrangement requires only few parts which are easily accommodated providing for a highly space-efficient CD storage rack.

Various preferred structural arrangements and embodiments are considered and claimed hereinafter.

The use of a spring clip in the form of an arc-like bent spring wire of circular cross-section facilitates attachment of the spring clip to the bottom plate. In addition, the arrangement re quires little space between the bottom plate and the disc carrier.

Because the CD carrier can be ejected by an ejector push button slide, use of the CD storage box is quite simple. By slide force reversal via a double arm lever which is pivotally supported on the support plate, ejection of the CD From the storage box is achieved in an advantageous manner simply by pushing the ejector slide into the box.

The ejector slide is slidably supported on the bottom plate between the side wall of the box and a web rib which preferably is integrally molded with the bottom plate. A spring is disposed in a cavity in the ejector slide so as to provide for the return of the ejector slide after being released by the operator The ejector slide is biased to abut a web rib projecting From the bottom plate such that the ejector slide is always in its original position when not operated. This provides for an optically pleasing appearance of a number of storage boxes arranged adjacent one another in a storage rack.

Since the connection between the ejector slide and the plate carrier resides in a double arm lever which has in its center area a pivot opening receiving a pin projecting from the bottom plate with which it is integrally molded, the lever can be easily removed from the bottom plate. The lever is connected to the slide by means of a pin which is integrally molded with the lever and which is received in a cavity in the slide so that the engagement of the lever with the slide is also easy to disconnect. Furthermore, since the lever is in engagement with the disc carrier by means of a pin integrally molded with the disc carrier which pin is received in a cavity in the lever, disengagement of the lever from the plate carrier is also very simple. Since disengagement of the lever from the slide and from the disc carrier and since the lever's mounting on the bottom plate are so simple the mechanism can be just as easily assembled. Consequently automatic assembly is greatly facilitated.

The disc carrier has at its bottom side a projection which is integrally molded therewith and which is provided with a recess which receives and firmly guides the spring clip. This is particularly important since, during insertion of a disc, the spring clip is under relatively high stress and assumes an undefined shape. The recess in the projection of the disc carrier further insures that the spring force is applied to the disc carrier always about at the same central point. This essentially prevents canting of the disc carrier in the disc storage box.

A rib integrally molded with the disc carrier so as to project upwardly at the rear end of the disc carrier along a line corresponding to a partial circumference of a CD and the ribs arranged at the sides of the disc carrier firmly position a CD on the disc carrier so that the CD cannot move back and forth and will not generate rattling noises. However, the ribs on the sides of the disc carrier project from the side walls only to such an extent that they engage only an edge portion of the CD which does not contain any information so that the CD is not subjected to any damage.

The side ribs are provided with small projections which engage the CDs and prevent unintentional sliding of a CD out of a CD box. The projections may be saw-tooth like or they may be in the form of a double ramp.

If the projections are saw-tooth like they are arranged in such a way that removal of a CD requires a larger force than the insertion thereof. If they are symmetric in the form of a double ramp, insertion and removal of a CD requires about the same force.

The sight slot in the front face of the box allows a user to see whether a CD is disposed in the CD box or whether the CD box is empty. However, such a determination can be made even easier by observing an indicator projection extending from the disc carrier into and through a cut-out in the front of the CD box. Since this cut-out is arranged immediately adjacent to the ejector slide, the indicator projection can be sensed, for example, during operation of the ejector slide by a finger to thereby determine whether a CD is in the particular box. This is particularly advantageous for motorists who, in this manner, do not have to take their eyes away from the traffic.

The CD box cover and bottom plates are preferably so formed that, when assembled, grooves are formed therebetween by which a CD box can be supported in a CD box rack structure. The grooves in the CD boxes and corresponding webs in the side walls of the rack make it possible to slide the CD boxes independently into the rack. The particular shape of the side edges of the CD boxes which are inclined so that adjacent CD boxes provide therebetween for a groove with inclined contact walls engaging respective ribs in the side walls of a rack structure provides for good support and guidance a CD box in the rack. By cementing the CD boxes on top of one another a CD box package may be formed which may be inserted, as a whole, into the CD box rack structure.

Further details and advantages of the arrangement according to the invention will be apparent from an embodiment described, by way of example only, in connection with the accompanying drawing.

DESCRIPTION OF A PREFERRED EMBODIMENT

Figure 1:
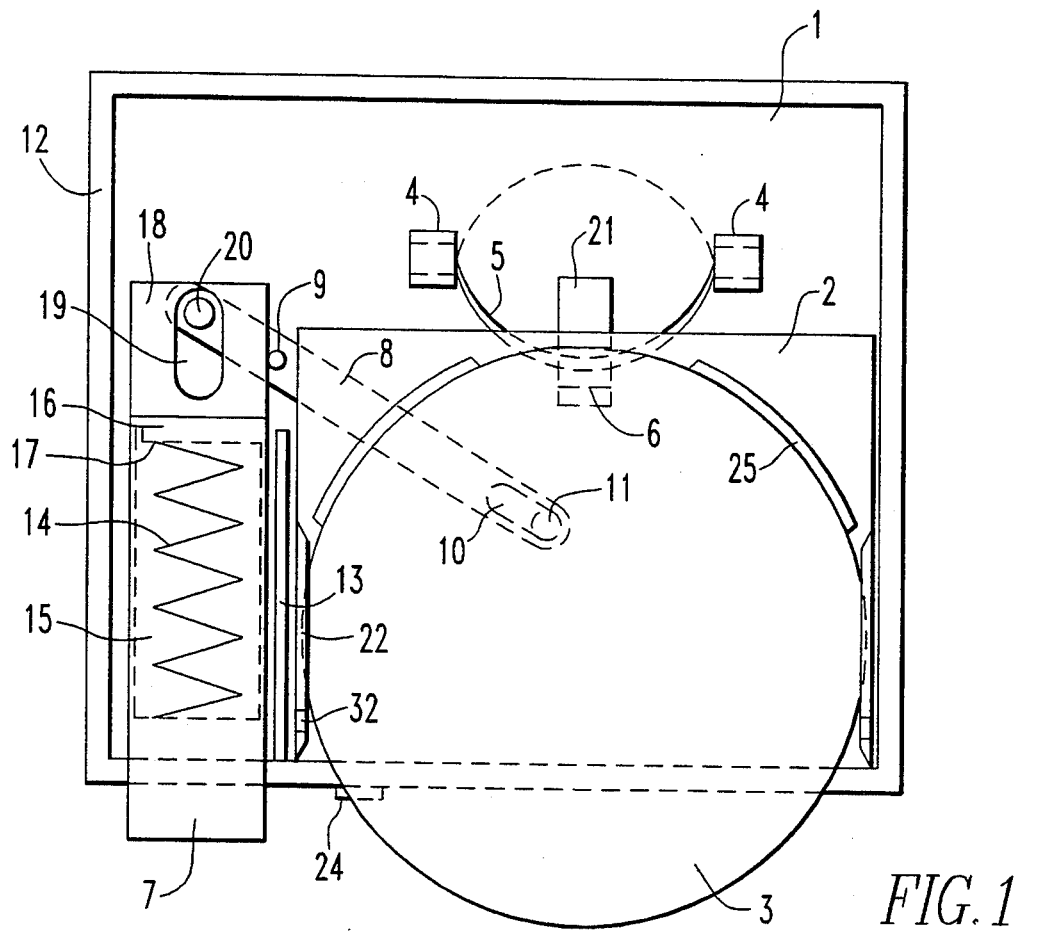
FIG. 1 shows a compact disc box with the cover plate removed.

As shown in FIG. 1, a disc carrier 2 for supporting a compact disc (CD) 3 is laterally slidably supported on a bottom plate 1. A spring clip 5 is mounted on the bottom plate 1 in pivot bearings 4. Preferably the spring clip is an arc-shaped spring wire of circular cross-section with outwardly bent ends mounted in the pivot bearings 4. The center of the spring clips 5 is received in a fork-like cavity of a projection 6 disposed on the underside of the disc carrier 2 and integrally molded therewith. The projection 6 is guided in a slot 21 formed in the bottom plate 1. At one side of the disc carrier 2 an ejector slide 7 is slidably supported. Guidance for the ejector slide 7 is provided by the side wall 12 of the CD box, the respective part of the bottom plate 1 and a web rib 13. The web rib 13 projects from the bottom plate 1 and is integrally molded therewith.

At its inner end the ejector slide 7 has a tongue 18 which has an opening 19 formed therein. Received in the opening 19 is a pin-like projection 20 of a lever 8, which is pivotally supported on a lug 9 projecting from the bottom plate 1 and integrally molded therewith. At its end opposite the pin-like projection 20 the lever 8 has an opening 10 in which a pin-like projection 11 extending from the underside of the disc carrier 2 is received.

Integrally molded therewith and projecting from its upper side, the disc carrier 2 carries a web structure 25. The web structure 25 is disposed adjacent the inner end of the disc carrier 2 and corresponds in shape to a partial circumference of a CD. The web structure 25 prevents a CD disposed on the disc carrier 2 to slide off the disc carrier 2. At its opposite side walls the disc carrier 2 has fins 22 which extend parallel to the base surface of the disc carrier 2. The fins 22 project toward each other into the area of the disc carrier 2 to an extent that they engage only the edge area of a CD disposed on the disc carrier 2. The distance of the fins 22 from the base surface of the disc carrier 2 is selected so as to correspond about to the thickness of a CD. In this manner a CD pushed onto the disc carrier 2 is retained on the disc carrier 2 with a slight grip at opposite edges. However the edge areas of a CD do not contain any information so that any damage to the disc edges by the fins 22 will not result in loss of data. The web structure 25 does not need to be continuous as shown in FIG. 1 but it may be interrupted or it may consist of narrow retaining elements, The fins 22 include projections 32 which are so arranged that a CD inserted into the CD box all the way to rear web structure 25 is engaged by the projections 32, The projections may have various shapes. Particularly effective protection against unintended sliding of the CDs out of the CD box is achieved if the projections 32 are saw-tooth shaped. But also other configurations are possible such as semicircular or mushroom-type shapes.

The ejector slide 7 includes a cavity 15 in which a spring 14 is disposed. The spring 14 is so disposed in the cavity 15 that it engages with one of its ends the end face of the cavity 15 next to the outer end of the ejector slide 7 whereas its opposite end engages the stop member 16 extending into the cavity 15.

It is noted at this point that although all the projections, pins and fins are integrally molded with the respective components of which they are part, they may also be made independently and mounted on the respective components. Pin-like projections may be made, for example, as threaded pins and threaded into the components or projections may be riveted onto the respective components.

FIG. 1 shows the disc carrier in its drawn-out position. After placement of a CD 3 onto the disc carrier 2, the disc carrier may be inserted into the CD box by applying pressure to the front edge of the disc carrier 2 or the front edge of the CD. During insertion the spring clip 5 is moved beyond its center dead point whereupon the spring clip will relax and assume the position shown in FIG. 1 by a dashed line. Since the spring clip is in engagement with the projection 6 on the underside of the disc carrier 2, the disc carrier 2 is then fully pulled into the CD box by the force applied thereto by the spring clip 5.

At the same time, as a result of the engagement of the pin-like projection 11 in the opening 10 of lever 8, the lever 8 is pivoted about the lug 9. Since the opening 19 in the ejector slide 7 in which the pin-like projection 20 of the ejector slide 7 is disposed is oblong, the position of the ejector slide 7 is not effected by the pivot movement of the lever 8. After pivot movement the pin-like projection 20 of the lever 8 is positioned at the front end of the oblong opening 19 where it may be moved by pushing the ejector slide 7. Upon pushing, the ejector slide 7 moves inwardly into the CD box on a slide guide. Since the pin-like projection 20 of the lever 8 abuts the outer end wall of the oblong opening 19 next to the ejector slide operating button, the pin-like projection is moved by the ejector slide 7 and pivots the lever 8 again about the lug 9. Since the pin-like projection at the underside of the disc carrier 2 is received in the opening 10 of the lever 8, the disc carrier 2 is moved out of the CD box whereupon the CD may be removed from the disc carrier 2.

It is pointed out that the ejector slide 7 needs to be moved into the CD box only until the spring clip 5 is beyond its dead center point. After passage of the dead center point, the spring clip 5 will relax and will assume its original position whereby the disc carrier 2 is moved out of the CD box until it reaches its outer end position.

Once the ejector slide 7 is released, the spring 14, which was compressed during inward movement of the ejector slide 7, expands and moves the ejector slide 7 again out of the CD box. The pin-like projection 20 the lever 8 is then at the inner end of the oblong opening 19 remote from the operating button end of the ejector slide 7. The oblong opening 19 in the ejector slide 7 permits the ejector slide 7 to always return to its design position.

The disc carrier 2 is provided at its front end with a projection 24 which, in the extended position of the disc carrier, projects forwardly through a cut-out in the front face of the CD box. The projection is so arranged that it can be detected by touch of a finger. The cut-out and the Projection 24 are arranged immediately adjacent the ejector slide 7 so that if is possible to detect the presence of the projection 24 in the cut-out before the ejector slide is operated. If the projection 24 is in the cut-out and no CD projects from the CD box, it is apparent that the CD box is empty.

Figure 2:
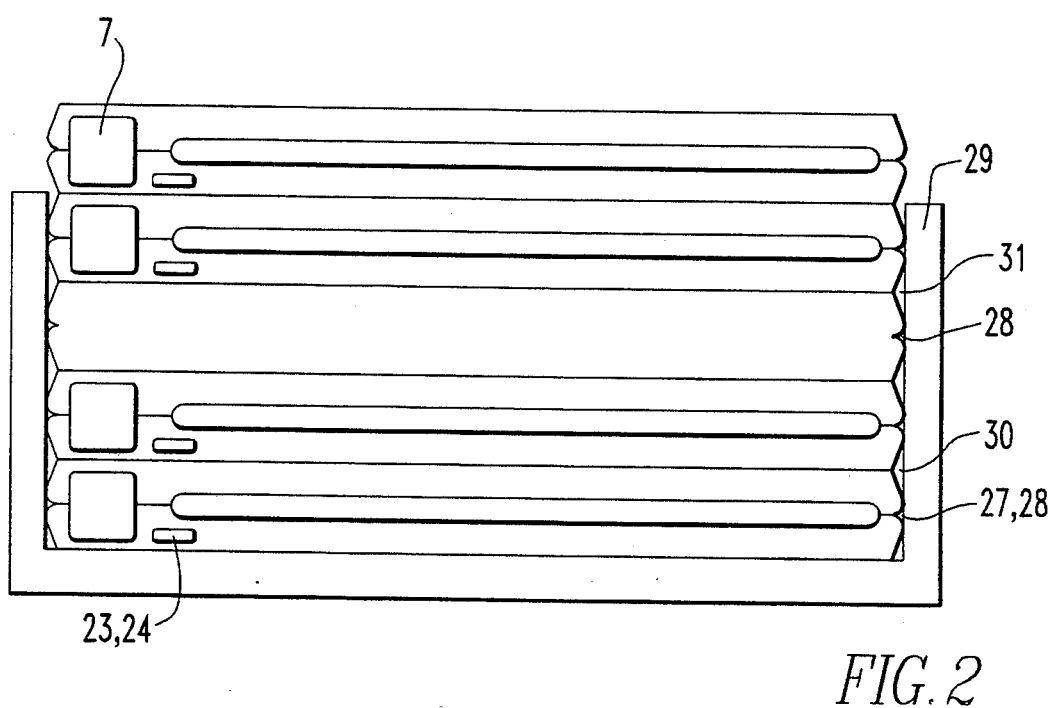
FIG. 2 shows several compact disc boxes disposed in a support rack.

As shown in FIG. 2 there is provided a rack 29 into which single CD boxes can be inserted. The bottom and cover plates of the CD box are so shaped that when the bottom and cover plates are assembled a groove 27 extends along the middle of the side walls. The rack 29 has corresponding webs 28 and 31. The webs 28 are somewhat smaller than the webs 31 and are received in the grooves 27 of the CD box. This permits insertion of single CD boxes into the rack. The edges of the CD box are so shaped that they are in abutment with the webs 31 when the CD box is inserted into the rack. If several CD boxes are combined, for example, by being cemented together to form a packet, additional grooves 30 are formed in the side walls between adjacent boxes as a result of the particular shape of the side walls of the CD boxes. The larger webs 31 of the rack are received in the additional grooves 30. This permits also the insertion of CD box packets into the rack. The webs 31 provide for good guidance and support of the CD box packets in the racks.

Since whole CD box packets can be inserted into a rack it is sufficient if only a portion of such a packet is engaged and supported by the rack. This permits the insertion of a CD box packet which includes more CD boxes than the rack would normally support, for example, a packet of eight CD boxes may be inserted into a rack designed for the reception of only five single CD boxes. The top three CD boxes project upwardly from the rack.

What is claimed is:

1. A compact disc storage box for receiving a compact disc (CD) consisting of a housing having a bottom plate and a cover plate with side walls joined together such that said bottom plate and said cover plate are disposed in spaced parallel relationship to each other and define therebetween a space with a front opening, a disc carrier supported in said housing so as to be slidable into, and out of, said housing through said front opening between an inner end position in which said disc carrier is fully inserted in said housing and an outer end position in which said disc carrier is slid at least partially out of said housing, means for releasably retaining said disc carrier in its inner end position, said retaining means including a spring clip mounted pivotally on said bottom plate and extending transverse to the direction of sliding movement of said disc carrier into, and out of, said housing, said spring clip engaging said disc carrier, an ejector slide slidably supported in said compact disc storage box adjacent to, and at one side of, said disc carrier so as to be slidable in the same direction as said disc carrier and a double arm lever pivotally supported on a lug integrally formed with the bottom plate and having first and second ends, the first end hinged to said ejector slide and the second end hinged to said disc carrier.

2. A compact disc storage box according to claim 1, wherein said spring clip is arcuately shaped and has opposite ends supported on said bottom plate.

3. A compact disc storage box according to claim 2, wherein said spring clip is a spring wire of circular cross section having outwardly bent ends supported on said bottom plate.

4. A compact disc storage according to claim 1, wherein said slide ejector is slidably supported on said bottom plate by an upwardly open guide structure defined at one side by a side wall and, at the other side, by a rib projecting upwardly from the bottom plate.

5. A compact disc storage box according to claim 1, wherein said ejector slide has downwardly projecting side, front, and rear walls defining a downwardly open cavity and a spring is disposed in said downwardly open cavity, said spring having an inner end and an outer end; wherein the outer end abutting the front wall of said ejector slide and wherein a stop member having first and second opposite sides is integral with said bottom plate and extending therefrom into said cavity, and wherein said inner end of said spring is abutting said first opposite side of said stop member and wherein said slide ejector has a slide ejector inner end with a tongue abutting the second opposite side of said stop member when said ejector slide is held by said spring in a forward rest position.

6. A compact disc storage box according to claim 5, wherein said tongue has an opening receiving a pin-like projection formed at said first end of said lever, said lever having at said other end an opening receiving a pin-like projection formed on said disc carrier.

7. A compact disc storage box according to claim 2, wherein said disc carrier has an underside and has a projection at its underside which is received in a guide slot formed in said bottom plate, said projection having a fork-like cavity receiving said spring clip.

8. A compact disc storage box according to claim 1, wherein said disc carrier has a rearward end at its rearward end an upwardly extending web structure formed along an arc having approximately in the radius of a compact disc wherein the web structure would prevent a CD placed on said disc carrier to slide off said disc carrier and side walls with fins extending parallel to the bottom plate and adapted to receive the edges of a CD disposed on said disc carrier for firmly engaging a CD in an area thereof which does not contain information and thereby prevent rattling of a CD.

9. A compact disc storage box according to claim 8, wherein said fins projecting from said side walls have projections so arranged that a CD inserted into said box all the way to the rear web structure would be engaged by said projections at the outer circumference thereof.

10. A compact disc storage box according to claim 1, wherein a sight slot is provided at the front end of said compact disc storage box.

11. A compact disc storage box according to claim 1, wherein a cut-out is provided in the front end of said box and said disc carrier has a projection which, when the disc carrier is in the outer end, position of said projection projects through said cut-out so as to permit detection whether said disc carrier is in its outer end or inner end position.

12. A compact disc storage box according to claim 11, wherein said cut-out and said projection are arranged immediately adjacent said ejector slide so that the presence of said disc carrier in its outer end position can be detected by touch of a finger.

13. A compact disc storage box according to claim 1, wherein said cover plate and bottom plate are each shaped having side edges, which, when assembled into the disc storage box, form grooves in the middle of the side walls of the compact disc storage box adapted to receive support webs of a compact disc storage box rack.

14. A compact disc storage box according to claim 13, each of wherein said cover plate and bottom plate has inclined side edges such that V-shaped grooves are formed between two disc boxes when joined together, said grooves being adapted to receive corresponding webs formed on the side walls of a disc box rack.

* * * * *